US005227175A

United States Patent [19]

Reinbold

[11] Patent Number: 5,227,175

[45] Date of Patent: Jul. 13, 1993

[54] APPARATUS FOR PROCESSING MONOFILAMENTS

[76] Inventor: Heinz Reinbold, Petersbergstrasse 5, 5200 Siegburg 1, Fed. Rep. of Germany

[21] Appl. No.: 768,581

[22] PCT Filed: Mar. 3, 1990

[86] PCT No.: PCT/DE90/00158

§ 371 Date: Sep. 17, 1991

§ 102(e) Date: Sep. 17, 1991

[87] PCT Pub. No.: WO90/11482

PCT Pub. Date: Oct. 4, 1990

[30] Foreign Application Priority Data

Mar. 21, 1989 [DE] Fed. Rep. of Germany ....... 3909175

[51] Int. Cl.[5] ............................................. B29C 35/06

[52] U.S. Cl. ...................................... 425/185; 34/154; 34/155; 425/186; 425/188; 425/445; 28/240

[58] Field of Search .................. 264/288.4, 235.6, 345, 264/346, 211.14–211.17, 29.2; 425/378.2, 66, 72.2, 445, 185, 186, 188; 34/23, 155, 154; 28/240

[56] References Cited

U.S. PATENT DOCUMENTS 2,807,863 10/1957 Schenker .......................... 264/235.6
4,299,036 11/1981 Schregenberger ...................... 34/23
4,314,981 2/1982 Miyamori et al. ................. 264/29.2
4,520,575 6/1985 Holmes et al. .......................... 34/23
4,534,780 8/1985 Cemin .
4,543,241 9/1985 Yoshinari et al. .................. 264/29.2
4,586,268 5/1986 Fleissner .............................. 34/155

FOREIGN PATENT DOCUMENTS 0143631 11/1984 European Pat. Off. .
1660314 9/1966 Fed. Rep. of Germany .
1916124 3/1969 Fed. Rep. of Germany .
1937492 7/1969 Fed. Rep. of Germany .
2032326 6/1970 Fed. Rep. of Germany .
2614258 4/1976 Fed. Rep. of Germany .
3538871 11/1985 Fed. Rep. of Germany .
1257128 2/1961 France ................................. 425/66
1384899 3/1988 U.S.S.R. ............................... 34/155

*Primary Examiner*—Jeffery Thurlow
*Attorney, Agent, or Firm*—Walter A. Hackler

[57] ABSTRACT

The invention concerns a process for orienting the fiber-like macromolecules of monofilaments in a bundle via air of a certain temperature. It consists in the fact that the monofilaments are processed in any desired number of individual flow zones arranged in series with one another, which extend orthogonally to the direction of travel of the monofilaments. The advantage of the invention is that with highly accurate temperature control, the stress on the individual monofilament in the bundle is uniform and homogeneous.

16 Claims, 5 Drawing Sheets

APPARATUS FOR PROCESSING MONOFILAMENTS

The invention relates to a process for orienting the fiber-like macromolecules of monofilaments in a bundle via air of a certain temperature.

The invention additionally concerns an air tunnel for processing monofilaments for the stretching or thermosetting process or the like, especially for performing the process according to claim 1, with an air circulation system and a working duct through which the monofilaments travel, which is made up of a lower part and an upper part, which is movable while the lower part is arranged in a stationary manner.

BACKGROUND OF THE INVENTION

A process of this kind and a corresponding apparatus for it have been disclosed by DE-PS 26 14 258.

Air tunnels of this kind are generally 1,000 mm wide and up to 5,000 mm long and are used for thermal processing of monofilaments. They are configured in two parts, and the monofilaments travel through the air tunnel between the two halves of the unit. To achieve uniform physical properties—such as tensile strength, elongation, modulus of elasticity, shrinkage, dimensional stability, abrasion resistance, and flexibility—for each of the individual monofilaments of a bundle, not only must the temperature over the entire surface constituted by the bundle of monofilaments be uniform, but also deviations in air velocity over the width and length of the air tunnel must be negligibly small. With air tunnels considered to embody the state of the art, temperature tolerances of $T = \pm 1°$ Celsius and air velocity tolerances of $v = \pm 0.05$ m/sec can be achieved in the working duct for the monofilaments.

It is easy to understand that the tolerances indicated can be achieved, over a surface area of as much as $F = 5$ $m^2$, only with very costly equipment, i.e. the walls must be especially thick, seals must be selected with particular care, and the outlay for manufacturing equipment surfaces that are subject to large temperature fluctuations, at least when a system is started up and shut down, is especially high.

Furthermore, in known air tunnels that are operated exclusively with hot air a maximum production volume is already being reached today; however this is no longer adequate for the demands of modern production lines, which are operating at higher and higher speeds.

The known air tunnel that is operated with hot air has the disadvantage of requiring long temperature compensation sections in order to heat the large masses of equipment uniformly. This results in a long warmup time when the known air tunnel is started up. Hot air is guided in two unit halves which are pivoted with respect to one another, the air channels of which are connected to each other. This connection is made by means of bellows or specially configured stuffing boxes. This design solution is complex and prone to malfunction.

Furthermore, the air delivery nozzles pull cold air into the known air tunnel. This has a detrimental effect on the surface temperature profile. The temperature profile is also subject to increased fluctuations in the region where hot air is withdrawn from the air tunnel, and at the lateral surfaces. The effect of these temperature changes is to reduce the quality of the monofilaments which are passing through, thus detracting from the uniformity of the material properties of the monofilament bundle. In addition, transverse baffles in the known air tunnel generate turbulence, which interferes with a uniform air velocity over the width and length of the known air tunnel. Lastly, mention should also be made of the numerous regulating flaps that are required in the known air tunnel so that air volumes can be distributed approximately uniformly.

The object on which the invention is based is therefore that of developing an air tunnel of the aforesaid type in such a way that with highly accurate temperature control, the stress on the individual monofilament in the bundle is uniform and homogeneous.

SUMMARY OF THE INVENTION

According to the present invention, this object is achieved by the fact that the monofilaments are processed in any desired number of individual flow zones arranged in series with one another, which extend orthogonally to the direction of travel of the monofilaments.

According to the present invention, the object is also achieved by the fact that the air tunnel consists of any desired number of modules, each of which has an upper part and a lower part, an air heater or an air cooler, and an air circulation unit, and which can be tightly coupled to one another at the ends of the modules, with the air circulation unit guiding the air in a crossflow manner through the working duct.

The air tunnel according to the present invention thus has the essential advantage that the temperature profile in the working duct is subject, over its entire width and length, to smaller fluctuations than can be achieved by any known air tunnel. The temperature profile of the air tunnel according to the present invention allows maximum fluctuations of $T = \pm 0.5°$ Celsius, thus decisively improving the product quality of the monofilaments. Operating the air tunnel with a crossflow creates, at both the entry and exit openings for a monofilament bundle, an air cushion that seals the open cross section of the working duct against cold air flows from the outside. With this feature, the temperature profile can be stabilized even in peripheral areas.

Because the air tunnel according to the present invention can be assembled from modules of any desired size, the size of the horizontal surface of the working duct can be kept so small that it can be operated with a precise, fluctuation-free temperature profile over the length and width of the working duct. Each module has an air heater or air cooler and an air circulation unit, so that depending on the output of a production facility, only one module more or less needs to be coupled onto the existing air tunnel. The temperature profile is independent of length. The air tunnel according to the present invention therefore does not need to be designed for particular production applications, but rather can be utilized universally as market conditions require. Monofilaments that are designed and required to meet the most stringent requirements in terms of desired diameter and physical data can be more easily produced with the air tunnel according to the present invention, and potential manufacturing rejects due to temperature fluctuations in the working duct can be ruled out.

The individual modules can be operated at different temperatures, so that depending on requirements, sections of an air tunnel can be selected for heating, conditioning, or drying the monofilaments. In conjunction with an air cooler in the module, a further structural modification of the monofilaments after stretching can be achieved by cooling.

If working duct surface areas of $F=0.5\ m^2$ to $F=1\ m^2$ are selected, in addition to the especially advantageous crossflow operation of the air tunnel according to the present invention it is readily evident that maintaining the temperature profile over the said surface area at a constant value requires less outlay for equipment than with known systems.

In a preferred embodiment of the invention, the upper parts of the air tunnel can be pivoted and/or displaced, together or each individually, with respect to the lower part.

This offers the advantage that the monofilaments can easily be fed through the air tunnel when starting up a monofilament facility, and that the individual module can quickly be opened up for cleaning purposes or in the event of a malfunction.

In addition, the working duct preferably has a cross-sectional area that is delimited at the top and bottom by flow grids.

This offers the advantage that air flows uniformly around each individual monofilament travelling in a bundle. The working duct is also delimited on all sides, at the top and bottom by the flow grids that protect the working duct. If a strand breaks, the monofilament falls onto the lower flow grid and is retained there. Vertically above the direction of travel of the monofilaments, the working duct is delimited by air cushions of the crossflow; laterally, the side walls of a module tightly seal the working duct.

In a further embodiment of the invention, there is placed in contact with the top surface of the flow grids which faces the bundle of monofilaments a slotted hole panel which is also retained there, and a sieve is arranged on the surface of the flow grids facing one air flow chamber.

This offers the advantage that the sieve generates a dynamic pressure, which causes the air to be uniformly distributed over the entire surface of the sieve. The air then flows through the flow grid and the slotted hole panel and flows uniformly around the monofilaments. The flow grid performs a supporting function for the sieve and the slotted hole panel, so that these can be made thin but nevertheless will not bend as a result of thermal expansion.

When the flow grids have been pulled out, the slotted hole panels can be removed from them and replaced by new, clean slotted hole panels. This offers the advantage that when a monofilament breaks, the ends of the monofilaments do not fall into the channels of the flow grids, where they can melt.

Furthermore, the flow grids are preferably arranged movably in the upper part and the lower part, and can be replaced while the air tunnel is in operation.

This offers the advantage that dirty flow grids, sieves, and slotted hole panels can quickly be replaced by new, clean ones. Dirty flow grids can be cleaned outside the air tunnel, and the air tunnel can continue operating while dirty slotted hole panels—resulting from strand breakage, for example—are cleaned.

In a preferred embodiment of the invention, the flow grids have channels which extend from one horizontal surface of the flow grids to the other.

This offers the advantage that in the working duct as well, air flow is guided in a controlled manner and air flows uniformly around the monofilaments.

In a development of the invention, the horizontal surfaces of the working duct are at right angles to the direction of travel of the monofilaments, and are delimited laterally by an access panel and a portion of a flow element.

This offers the advantage that the working duct is delimited effectively and in a sealed manner on its sides, with simple design means. With the configuration just described, no edges are present in these areas.

Furthermore, in a preferred embodiment of the invention, the flow element is in two parts and is incorporated into both the upper part and the lower part, and separates the module into two vertically oriented air flow chambers, with the working duct being arranged in one air flow chamber and an air heater or air cooler, filter apparatus, and an air circulation unit being provided in the other air flow chamber.

This offers the advantage that the usability of the air tunnel is not restricted by the configuration of the flow element. Moreover, the one air flow chamber with the working duct can be kept largely free of internal fixtures which might cause disruptions in the flow in the area of the working duct. The flow element not only separates the two flow chambers, but also promotes a largely circular circulation of hot or cold air.

In a further embodiment of the invention, temperature sensors, humidity sensors, and air regulation elements are provided in the air flow chambers.

This offers the advantage that the physical properties of the air and its flow rate per unit time can be sufficiently determined, both before it enters the working duct and after it emerges from the working duct.

Furthermore, the air heater is preferably installed as a unit in the air flow chamber, and can be replaced separately from the replaceable filter apparatus, preferably filter mats.

In the event of a malfunction, on the one hand this allows quick replacement or repair of the air heater, and the filters mats can, separately therefrom, be replaced or cleaned when their pressure drop in the module is too large. If the monofilaments are to be cooled rather than heated in a module, the air heater can then be replaced by an air cooler without major conversion effort. The filter mats prevent contamination of the air heater or air cooler, and remove detrimental dirt particles, which might have a negative effect on processing of the monofilaments, from the air flow. The filter mats are arranged in the module in a displaceable manner on guide rails so that they can be quickly replaced.

If, in a preferred embodiment of the invention, the air circulation unit is a fan, which is preferably installed below the air heater in the air flow chamber, this guarantees that the air flowing in the working duct has passed through a sufficiently long stabilization zone. The fan can be operated, with simple means, in both blade rotation directions, so that air can flow onto the monofilaments through the working duct not only onto their surface from above, but also from below.

In a preferred embodiment of the invention, the modules have side walls that consist of one- or multiple-part insulation panels and can be fastened to a frame of the module.

This offers the advantage that the module itself can be constructed, in an economical and rapid manner, from simple prefabricated elements. Moreover, the elements are mutually interchangeable. The insulation of the module needed in order to suppress undesired heat radiation can be selected on the basis of the application, for example by fastening insulation panels of various thicknesses to the panel.

In a further embodiment of the invention, the modules have a fresh air conduit and an exhaust air conduit, which connect one or both air flow chambers with the outside.

This offers the advantage that the air tunnel according to the present invention can also be used as a convection dryer or convection extractor. The moisture load of the air in the module, as well as the air flow rate, can be controlled as desired. Air saturated with $H_2O$ can be dehumidified by means of known devices, which are connected to the module via either the fresh air conduit or the exhaust air conduit.

This offers the advantage that modules, especially in the front part of the air tunnel, can be used as dryers for the monofilaments. Better product quality can be obtained in the stretching process when the monofilaments are water-free. In addition, recirculation of air that is supersaturated with water, and therefore undesired condensation in the modules, can be prevented.

In a preferred embodiment of the invention, the modules have casters and adjustment screws, pointing outward on the bottom.

This offers the advantage that the individual modules can easily be moved and accurately aligned with one another.

In a further preferred embodiment of the invention, the modules have overhead walls and bottom walls, and the air tunnel has an entry wall and an exit wall, onto which insulation panels can be fastened.

This offers the advantage that with simple means, both the entry and the exit wall can be insulated in accordance with thermal requirements, on the basis of the air tunnel length.

In a further embodiment of the invention, the upper part and the lower part are securely joined to one another and form a module that has a working duct that is provided along one side wall with an opening that can be tightly covered with a molding by means of manually actuated or automatic closing means. The openings of multiple modules that are arranged in series with one another in a sealed manner can be covered in an airtight manner with a molding, and the molding can unblock areas of the openings of various sizes.

This offers the advantage that, although the module is not divided, the working duct is easily accessible. The openings of all the modules can be unblocked by displacing the molding. If a guide rail is applied to the top outer edge of the molding, the monofilament bundle can be guided along this guide rail during the threading process. The guide rail is preferably made of material with poor thermal conductivity, so that during hot-air operation the guide rail always remains cold.

If, in a further embodiment of the invention, the modules have wall insulation fastened by means of insulation bridges, this guarantees that when temperatures in the air tunnel are high, the modules themselves are exposed only to minor thermal expansion.

The air tunnel according to the present invention thus meets all the expanded requirements that are imposed in the production of ultrahigh-precision monofilaments. The output of the air tunnel can be expanded as desired, it is easy to operate and maintain, and it can accurately maintain a predefined temperature field in a self-regulating manner. Individual modules of the air tunnel can be used either to heat or to cool the monofilaments. The modules can also be held together by being guided on longitudinal supports, and the lateral opening of the working duct can be sealed by a plurality of individually configured access panels or by a molding.

Further advantages are evident from the description and the attached drawings. Similarly, the features mentioned above and those indicated below can in each case, according to the present invention, be used individually or in any combination with one another. The embodiments mentioned are not to be understood as a definitive enumeration, but rather are exemplary in nature.

BRIEF DESCRIPTION OF THE DRAWINGS

The invention is illustrated in the drawings and will be explained in more detail with reference to practical examples in the drawings, in which.

The individual Figures of the drawings in some cases show the object of the invention in highly schematic form, and are not to be understood as being to scale. The subjects of the individual Figures are in some cases depicted greatly magnified so that their structure can be better indicated.

DETAILED DESCRIPTION

Figure 1:
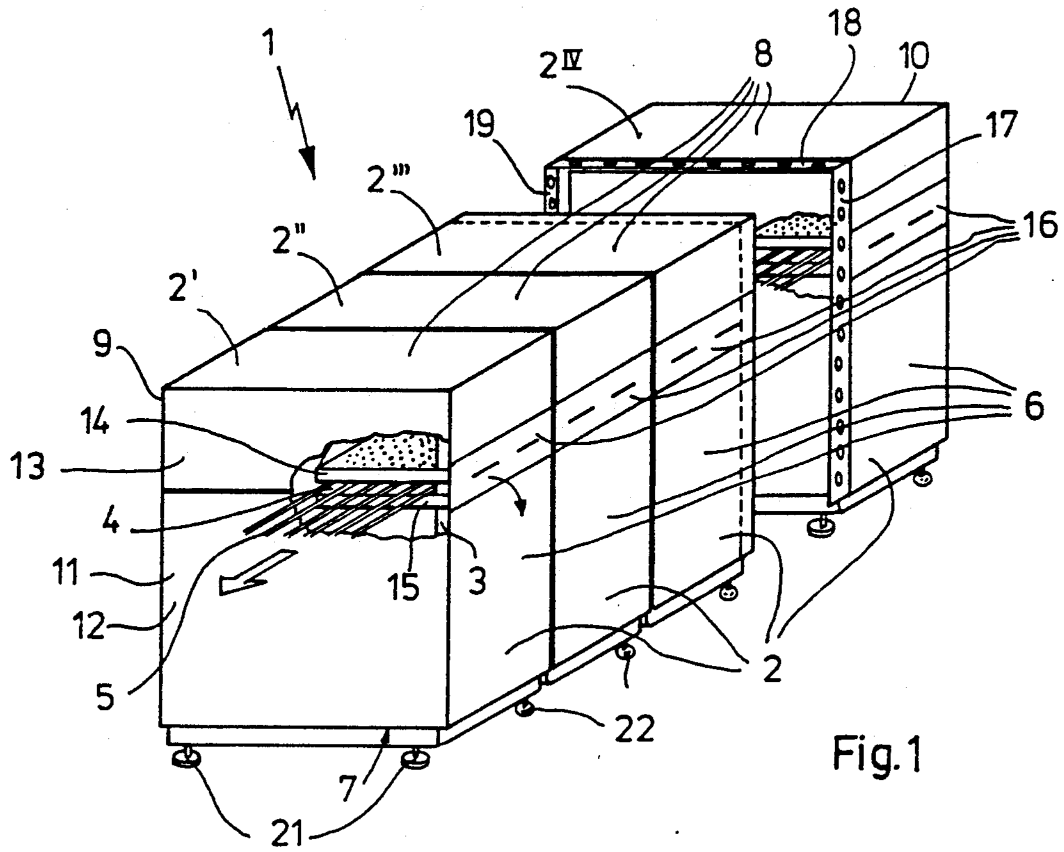
FIG. 1 shows an air tunnel according to the present invention, consisting of a plurality of modules.

In FIG. 1, 1 indicates an air tunnel that is composed of individual modules 2. In FIG. 1, a first, module 2I, a second module 2II, and a third module 3III are securedly coupled to one another, while for the sake of clarity, a fourth module $2^{IV}$ is shown separated form the modules 2I, 2II and 2III. The modules 2 have a frame 3 in which a working duct 4 is left open. In the working duct 4, monofilaments 5 are arranged in a bundle. The monofilaments 5 are distributed over the entire width of the working duct 4. The monofilaments are transported in the direction of the arrow. The individual modules 2 are composed of a side wall 6, a bottom wall 7, an overhead wall 8, and a side wall 9 that is not visible in the Figure. The walls are fastened to the frame 3. Each module 2 is equipped with an entry wall 10 and an exit wall 11, which delimit the air tunnel 1 both at the beginning and at the end, but also between the individual modules 2. Insulation panels which prevent heat radiation in the respective direction can be placed or fastened on the entry wall 10 and on the exit wall 11 at the beginning and end respectively.

Each module 2 is composed of a lower part 12 and an upper part 13. With the lower part 12 arranged in a stationary manner, the upper part 13 can be pivoted and/or displaced with respect thereto. Guided displaceably in the lower part 12 and in the upper part 13 are flow grids 14, 15, which delimit the working duct 4 of the module 2 both at the top and at the bottom. Arranged on the horizontal surfaces of the flow grids 14, 15 are slotted hole panels 14', 15' facing the monofilaments 5, and sieves 14", 15" diametrically thereto (see FIG. 5). The flow grids 14, 15 not only support the slotted hole panels 14', 15' and the sieves 14", 15", but also distribute and guide the air flowing in the working duct 4. The flow grids 14, 15 can be removed from the module 2 through an access panel 16 in the side wall 6. The modules 2 can, as shown by way of example in FIG. 1 for modules 2II and $2^{IV}$, be securely joined to one another by means of fastening moldings 17, 18, 19. The fastening moldings 17, 18, 19 engage in corresponding recesses in the adjacent module 2III, and can be securely joined to one another by means of oblong holes through which the screws engage.

The individual modules 2 can be aligned with one another, by means of adjustment screws 21, so that the working duct 4 of the air tunnel 1 forms a plane that is horizontally aligned. In addition to the adjustment screws 21, two casters 22 are attached, by way of example, to the module 2. The depiction in FIG. 1 conceals one of the casters 22 on each of the modules 2.

Figure 2:
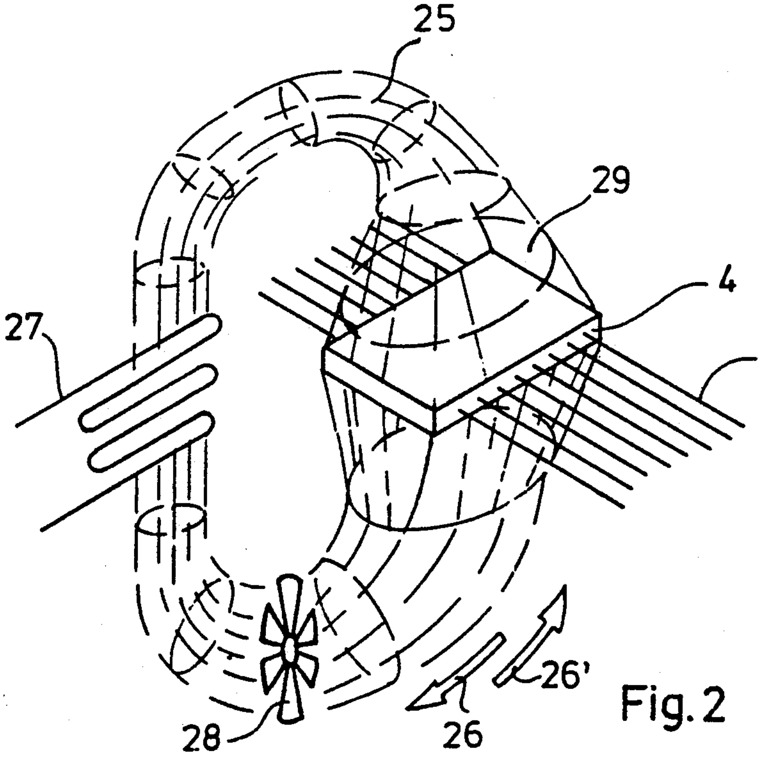
FIG. 2 shows, very schematically, the functional principle of an individual module of an air tunnel according to the present invention.

FIG. 2 shows in highly schematic form the functional principle of the air tunnel 1 according to the present invention. An air flow 25 can be guided in antiparallel arrow directions 26, 26'. The air flow 25 is heated by an air heater 27. The air heater 27 can be replaced by an air cooler. An air circulation unit 28, preferably a fan, keeps the air circulating, for example by forcing it from below, in the direction of arrow 26', into the working duct 4 through which the monofilaments 5 are travelling in a bundle. If the operating direction of the air circulation unit 28 changes, the air flow 25 will be forced vertically upward through the air heater 27 (or the air cooler), and flow from above into the working duct 4. In this case air will flow around the monofilaments 5 from top to bottom. Depending on the application, it is also possible for the air flow in a module 2 to be directed in the direction of arrow 26', and for the air flow in a module immediately adjacent thereto to travel in the direction of arrow 26. Moreover, in one air tunnel 1 one or more modules 2 can be used as dryers, as stretching or thermosetting units, or as coolers. The air circulation unit 28 can also be operated so that the air is forced during one time interval in the direction of arrow 26', and during another time interval in the direction of arrow 26. Each module 2 has a flow zone 29 to which the monofilaments 5 are exposed.

Figure 3:
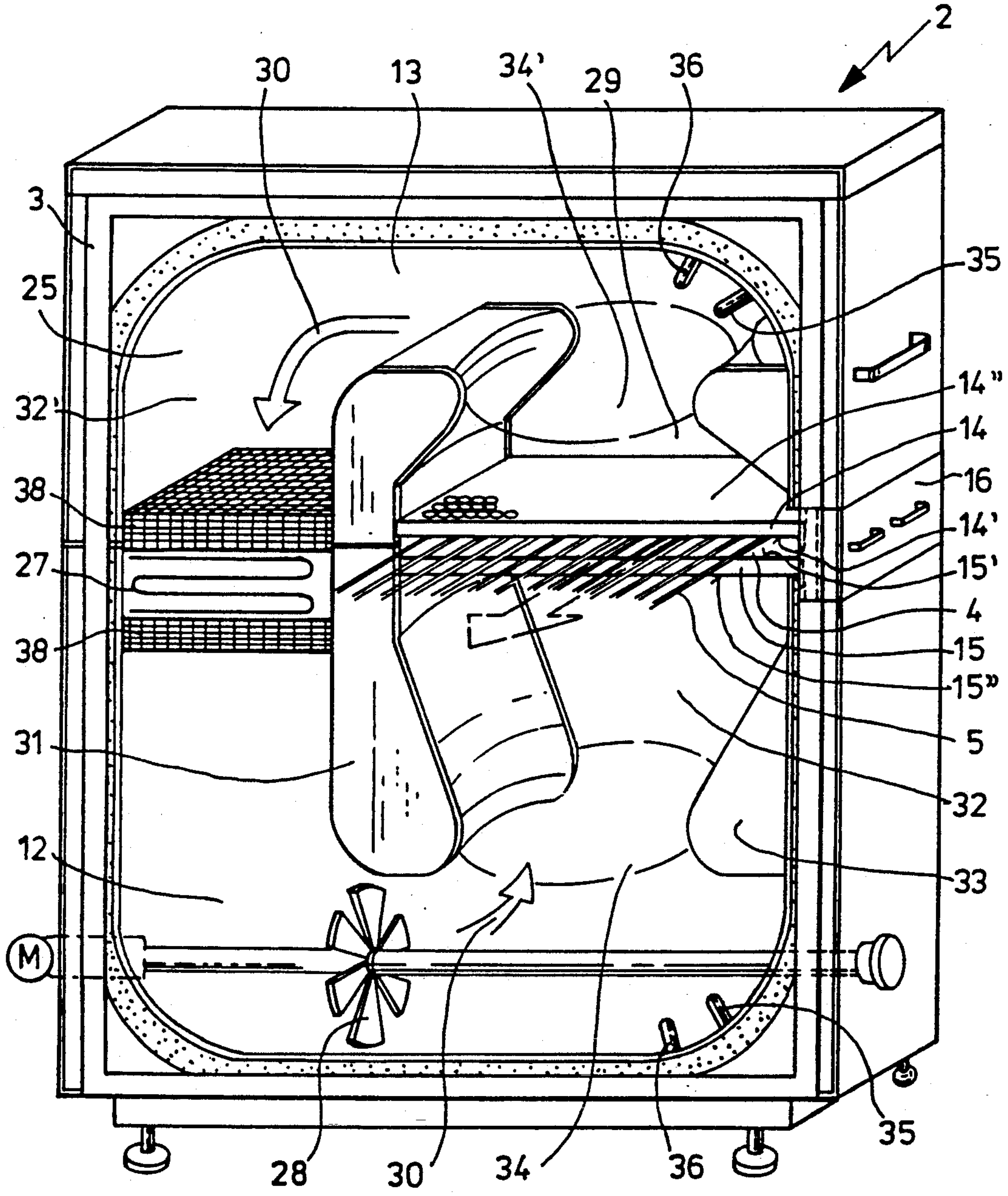
FIG. 3 is a perspective depiction of one module of an air tunnel according to the present invention, in section.

FIG. 3 shows the air tunnel 1 in a perspective depiction with the essential internal fixtures. The exit wall 11 has been removed from the module 2. Fastened to the frame 3 on the outside are the walls, and on the inside are insulation mats, which are covered by air tunnel surfaces, preferably thin panels. In the case illustrated, the air flow 25 travels in the direction of arrow 30, i.e. the air is forced from below, through the flow grid 15 (which can be fitted with the sieve 15" and the slotted hole panel 15'), into the working duct 4, and leaves the working duct 4 through the flow grid 14. The direction of travel of the monofilaments 5 is indicated by an arrow drawn with dashed lines. In the Figure, the sieves 14", 15" and the slotted hole panels 14', 15' are not drawn on the flow grids 14, 15.

A flow element 31 constructed in two parts, of which one part is fastened in the upper part 13 and the other half in the lower part 12, separates the interior of the module 2 into air flow chambers 32, 32'. In the air flow chamber 32, flow deflection panels 33 are arranged so that together with the flow element 31, they form circular openings 34, 34' at the upper and lower ends of the air flow chamber 32. The air flow chamber 32 constitutes the flow zone 29. The circular openings 34, 34' flare out from the openings 34, 34' towards the flow grids 14, 15, preferably in the form of a truncated cone, the circular surface of which with the larger diameter transitions into a rectangular surface which corresponds to the surface of the flow grids 14, 15. Air is circulated in the air flow chambers 32, 32' by the fact that the air circulation unit 28 draws air through the air heater 27 or an air cooler (not shown), and forces it from below through the opening 34 into the working duct 4. In the process, the air becomes uniformly distributed across the surface of the flow grid 15.

Located in the air flow chambers 32, 32' are temperature sensors 35, humidity sensors 36, pressure sensors, airflow rate measurement points, and air velocity measurement points. For example, in FIG. 3 the temperature sensors 35 and the humidity sensors 36 are depicted at the upper and lower ends of the air flow chamber 32.

The air heater 27 is enveloped at a distance, at both top and bottom, by filter mats 38. The filter mats 38 retain low molecular wight particles that circulate int eh air flow 25, and also guarantee that no dirt particles can enter the air heater 27. The air heater 2, like the filter mats 38, is installed in the module 2 in such a way that each individual one can be quickly removed from the module 2, for example so that the air heater 27 can be replaced by an air cooler.

The flow grids 14, 15, which are retained in guide rails in the module 2, can be replaced by opening the access panel 16.

Figure 4:
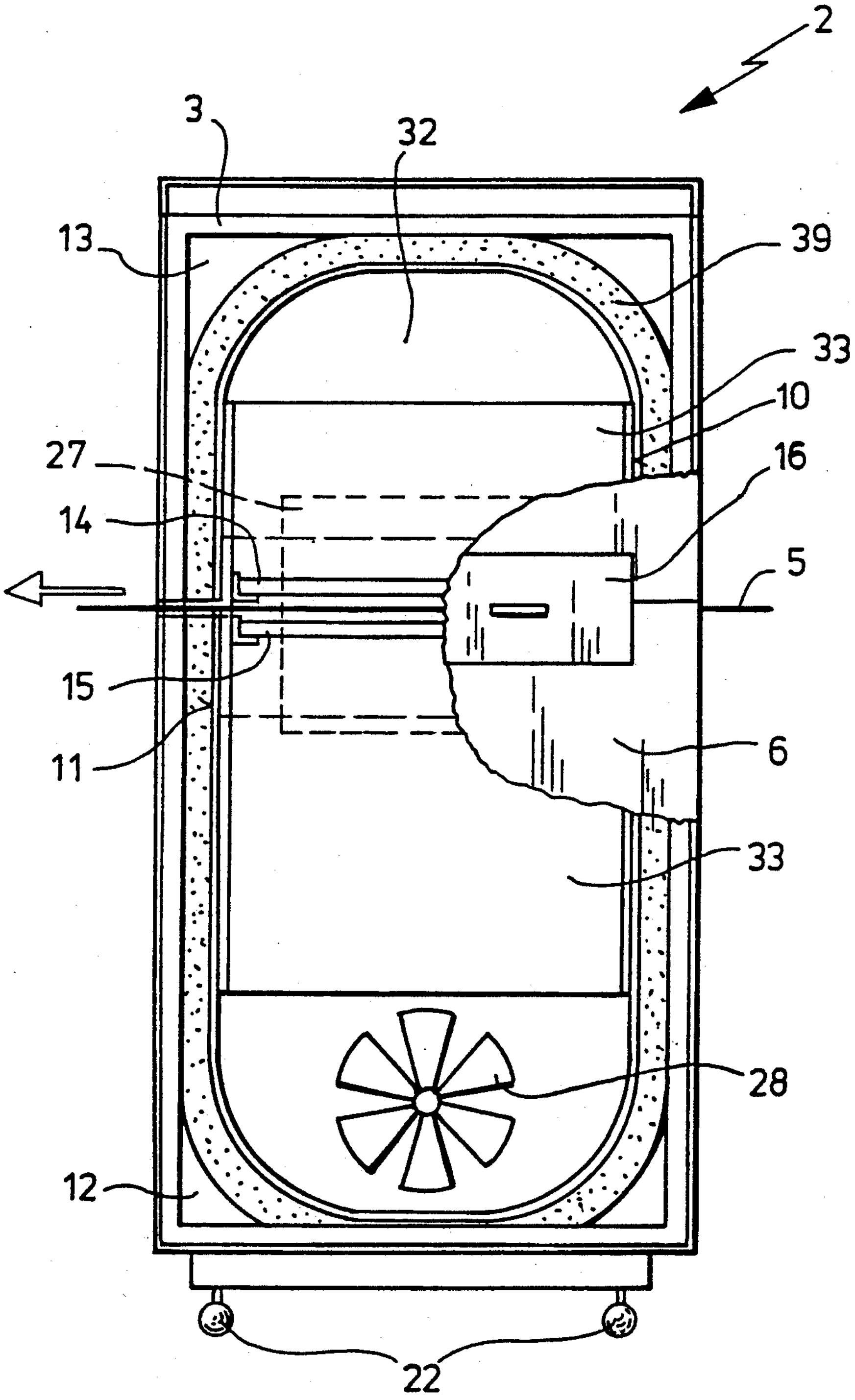
FIG. 4 is a side view of one module of an air tunnel according to the present invention.

FIG. 4 shows a side view of the module 2 in which, for the sake of clarity, portions of the side wall 6 have been cut away. The monofilaments 5 are guided through the module 2 in the direction of the arrow. The flow deflection panels 33 are contiguous, on the inside, with the entry wall 10 and the exit wall 11. Extending between the flow deflection panels 33 and the flow element 31 is the air flow chamber 32. The internal insulation of the module 2 is marked 39 in the Figure. If a plurality of modules 2 are arranged in series with one another to form an air tunnel 1, the internal insulation can be omitted in the area of the entry wall 10 and the exit wall 11. The air circulation unit 28 is installed in the lower part 12. Only a portion of the access panel 16, which tightly seals the flow grids 14, 15 laterally in the module 2, is shown. The upper part 13 can be pivoted and/or displaced with respect to the lower part 12. Figure indicates, by way of example, casters 22 with which the module 2 can be displaced. The air heater 27 is depicted with dashed lines in the Figure.

Figure 5A:
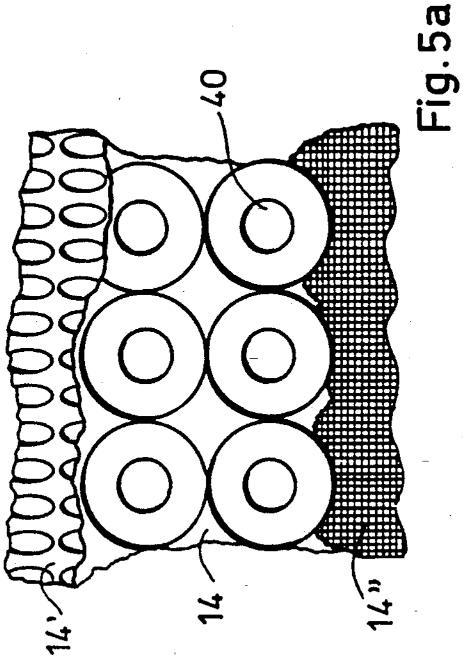
FIG. 5*a* shows a partial cutaway of a flow grid according to FIG. 5, in a top view at enlarged scale.
Figure 5:
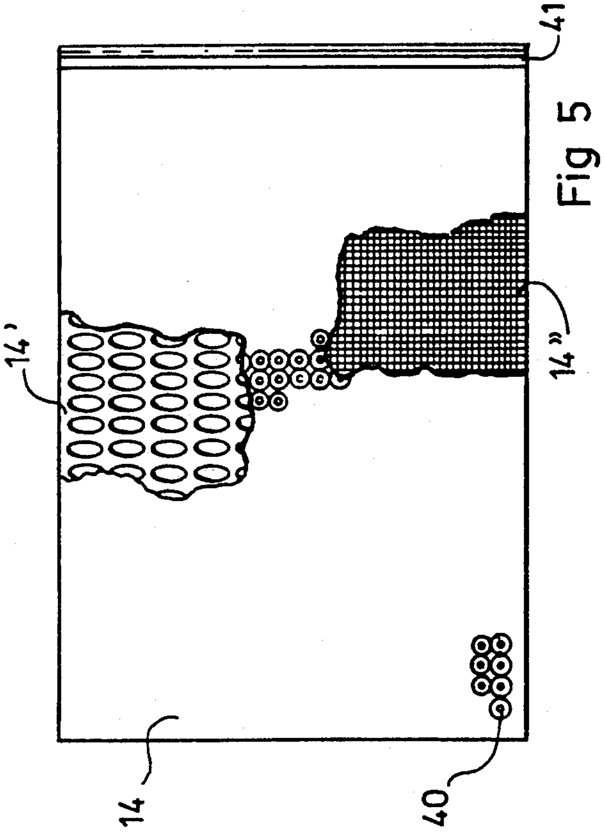
FIG. 5 is a top view of a flow grid of one module, with various cutaways.

FIG. 5 shows a top view of the flow grid 14 and, in cutaway view, portions of the slotted hole panel 14' and the sieve 14". The top view corresponds to the flow grid 15 (not shown). The flow grid 14 has over its entire surface channels 40 (not all of which are depicted), which are arranged contiguously tight to one another and have, for example, a circular opening. The sieve 14" generates a dynamic pressure in the air flow chamber 32. The dynamic pressure is sufficiently high that the air becomes uniformly distributed across the surface of the sieve 14".

FIG. 5*a* shows a top view of a portion of the flow grid 14, at enlarged scale. The channels 40 taper to a circular cross section whose diameter is smaller than the diameter of the circular opening at the surface of the flow grid 14. The circular openings on the surface are covered on one side by the sieve 14" and on the other side by the slotted hole panel 14'.

Figure 6A:
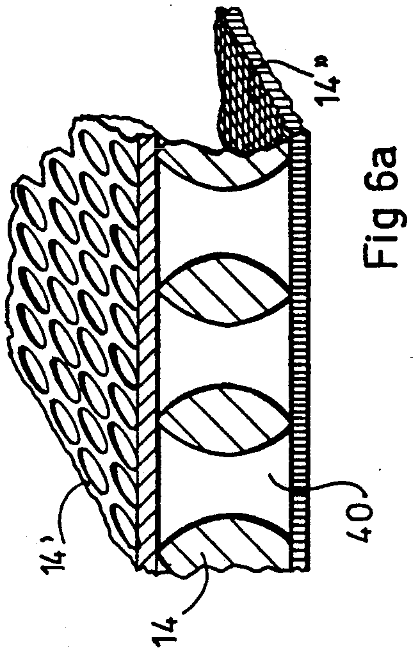
FIG. 6*a* is a partial cutaway of the section according to FIG. 5*a*, at enlarged scale and in perspective.
Figure 6:
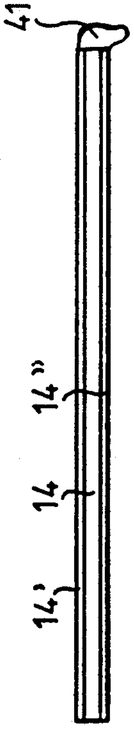
FIG. 6 is a front view of the flow grid, with profiled molding, slotted panel, and sieve according to FIG. 5.

FIG. 6 shows the flow grid 14 in a front view corresponding to FIG. 5, with the slotted hole panel 14' and the sieve 14". Along one side extends a profiled molding 41, which interacts with the access panel 16 when the flow grid 14 is installed. The inner side of the access panel 16 contacts the profiled molding 41. The profiled molding 41 can be made from an insulating material, and can additionally have a sealing strip facing the access panel 16, which when the access panel 16 is closed is located between the profiled molding 41 and the access panel 16 and is slightly deformed by the pressure of the access panel 16.

FIG. 6*a* shows a partial cutaway of the individual channels 40, enlarged and depicted in perspective. Portions of the slotted hole panel 14' and the sieve 14" border the channels 40. Proceeding from the two surfaces, the channels 40 illustrated here as examples are two truncated cones, the smaller-diameter openings of which are in contact with one another.

Figure 7:
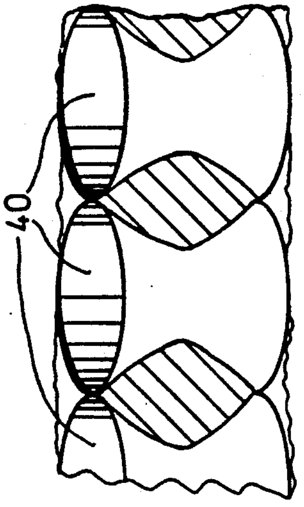
FIG. 7 shows a partial cutaway of an exemplary shape of the channels of the flow grid, enlarged and depicted in perspective.

FIG. 7 again shows, in another depiction, the possible structure of a flow grid 14, 15.

Figure 8:
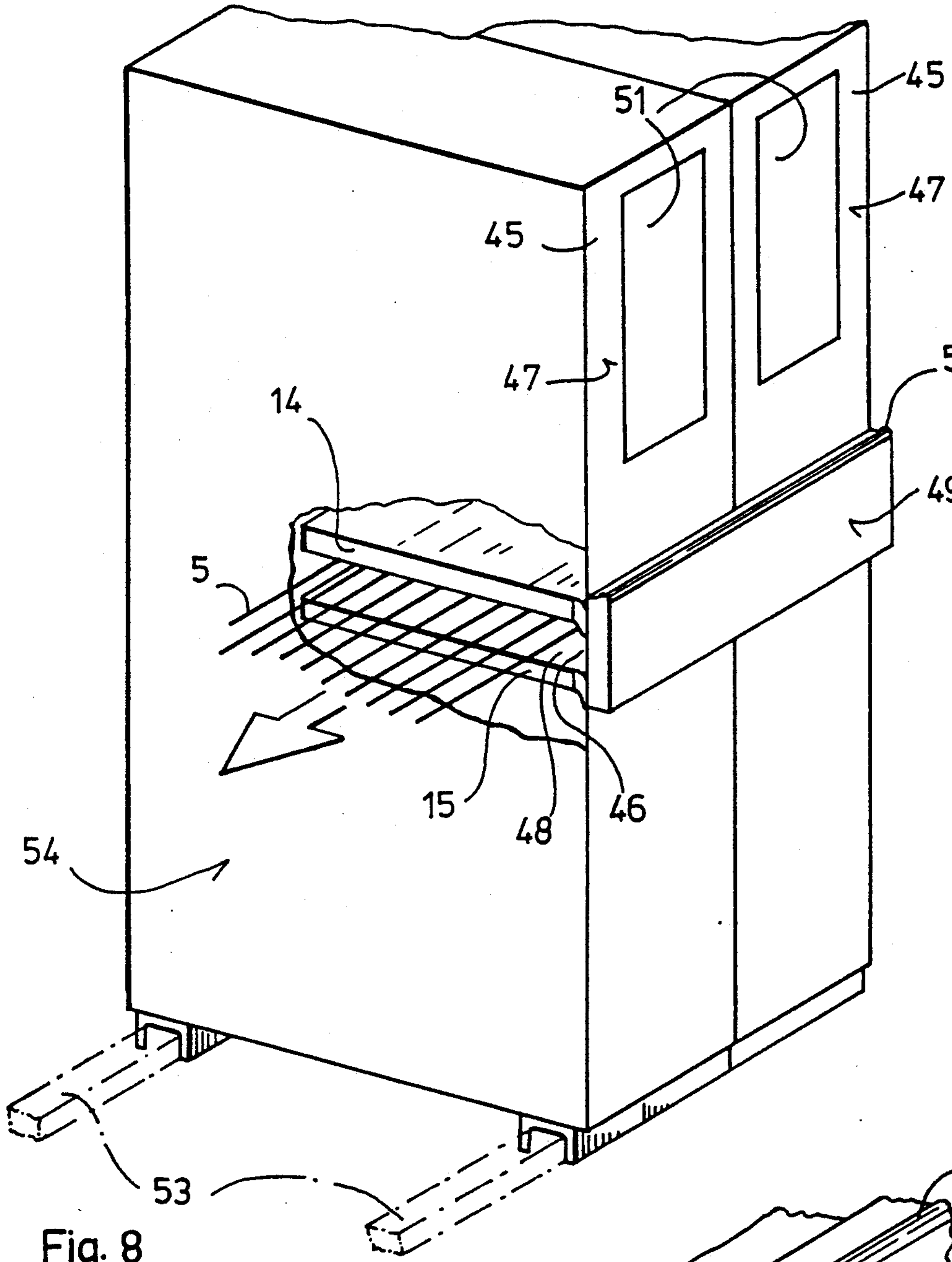
FIG. 8 shows a further practical example of an air tunnel according to the present invention, consisting of, for example, two modules.

FIG. 8 shows a further practical example of an air tunnel according to the present invention, which in the Figure is composed, by way of example, of two modules 45. In the modules 45 the upper parts and lower parts are securely joined to one another. Configured between the upper and lower parts is a working duct 46. The monofilaments 5 are transported in the working duct 46 in the direction of the arrow. The working duct 46 is open towards one side wall 47 of each module 45. It has an opening 48. The opening 48 can be covered by a molding 49. The molding 49 can be displaced downward by means of manually actuated or automatic devices. This makes it possible for the molding 49 to unblock the opening 48, completely or only partially. In the Figure, the molding 49 extends over both modules 45, so that when the molding 49 is displaced, the opening 48 of both modules 45 is unblocked simultaneously. A guide rail 50 is provided on the top outer edge of the molding 49. The guide rail 50 is made of a material with poor thermal conductivity, and is preferably convex in cross section. The monofilament bundle can be guided parallel to the guide rail 50 during threading of the monofilaments 5 through the working duct 46 when the molding 49 is located at the side walls 47 of the module 45 in a position at which the openings 48 are partly unblocked.

In FIG. 8 the side walls 47 also have an operating board and monitoring display panel 51 (not characterized in greater detail), which is provided, for example on the module 45, in order to accommodate displays, switches, and operating knobs. The modules 45 are guided on a longitudinal support 53 and fastened thereto. The longitudinal supports 53 are partially drawn in the Figure with dashed lines, indicating that depending on the length of the longitudinal support 53, additional modules 45 can also be coupled to the already existing modules 45. An exit wall 54, which acts as an insulation wall to prevent heat radiation, can be fastened to the outer side of the module 45 that terminates the air tunnel. If additional modules 45 are to be coupled to one another, the exit wall 54 is removed, the additional modules 45 are added, and the exit wall 54 is again installed on the last module, i.e. on the outer side through which the monofilaments 5 emerge.

Figure 9:
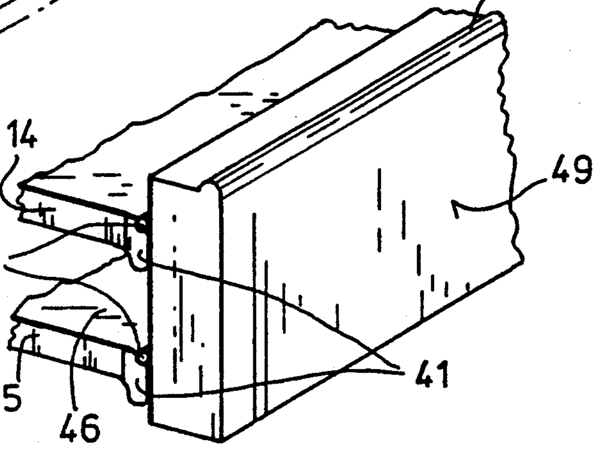
FIG. 9 shows a portion of a molding at enlarged scale according to FIG. 8.

FIG. 9 shows a section of a molding 49 at enlarged scale, indicating how it contacts the profiled moldings 41 of the flow grids 14, 15. The profiled moldings 41 can also, as shown in the Figure, have sealing strips 55 that are slightly deformed by the pressure of the molding 49, thus tightly sealing the working duct 46 against the side wall 47.

What is claimed is:

1. Air tunnel for processing monofilaments by stretching or thermosetting or the like, said air tunnel comprising a plurality of modules, each module comprising a moveable upper part and a stationary lower part, a device for tempering air and an air circulation unit, said modules being adapted for tightly coupling to one another at ends of the modules to form an air circulation system having a working duct through which the monofilaments travel, the air circulation units guiding air in a crossflow manner through the working duct, said upper and lower parts being joined to one another in order to form the working duct, said working duct having an opening, and automatic closing means for tightly covering the opening with a molding.

2. Air tunnel according to claim 1, wherein the upper part of each module is mounted for pivotal or translateral movement together with other modules upper parts or each individually, with respect to the module lower parts.

3. Air tunnel according to claim 1, wherein the working duct has a cross-sectional area that is delimited at a top and bottom by flow grids.

4. Air tunnel according to claim 3, further comprising a slotted hole panel contacting and retained on a surface of the flow grids facing the bundle of monofilaments, and a sieve disposed on the surface of ht flow grids facing an air flow chamber.

5. Air tunnel according to claim 3, wherein the flow grids are removably disposed in the upper part and the lower part, of the modules and can be replaced while the air tunnel is in operation.

6. Air tunnel according to include means defining channels extending from one horizontal surface of the flow grids to another.

7. Air tunnel according to claim 1 wherein horizontal surfaces of the working duct are at right angles to the direction of travel of the monofilaments, and are delimited laterally by an access panel and a portion of a flow element.

8. Air tunnel according to claim 7, wherein the flow element comprises two parts and is incorporated into both the upper part and the lower part of the modules and separates the modules into two vertically oriented air flow chambers, with the working duct being arranged in one air flow chamber and an air heater or air cooler, filter apparatus, and an air circulation unit being disposed in the other air flow chamber.

9. Air tunnel according to claim 8, further comprising temperature sensors, humidity sensors, and air regulation elements disposed in the air flow chambers.

10. Air tunnel according to claim 9, wherein the air heater is removably installed as a unit in the air flow chamber, and can be replaced separately from the replaceable filter apparatus.

11. Air tunnel according to claim 10, wherein the replaceable filter comprises filter mats disposed in each module in a displaceable manner on guide rails.

12. Air tunnel according to claim 8, wherein the air circulation unit comprises a fan, installed below the air heater in the air flow chamber.

13. Air tunnel for processing monofilaments for the stretching or thermosetting process or the like, the air tunnel comprising a number of modules, each having an upper part and a lower part, a device for tempering air, and an air circulation unit, said modules being adapted for tightly coupling to one another at ends of the modules to form an air circulation system having a working duct through which the monofilament travels, with the air circulation units guiding the air in a crossflow manner through the working duct, the modules having side walls comprising insulation panels fastened to a frame of the module, the modules including a fresh air conduit and an exhaust air conduit connecting at least one air flow chamber with the outside and wherein the modules include casters and adjustment screws pointing outward on a bottom, the modules include overhead walls and bottom walls, and the air tunnel includes an entry wall and an exit wall, onto which insulation panels are to be fastened, wherein the upper part and the lower part are securely joined to one another and form a module that has a working duct along one side wall with an opening, and automatic closing means for tightly covering the opening with a molding.

14. Air tunnel according to claim 13, further comprising means for covering the openings of multiple modules, arranged in series with one another, in a sealed manner with a molding, and the molding is sized for partially unblocking the openings.

15. Air tunnel according to claim 14, wherein the molding includes a guide rail at a top outer edge thereof.

16. Air tunnel according to claim 1, wherein the modules have wall insulation fastened thereto with insulation bridges.

* * * * *